United States Patent [19]

Bauer et al.

[11] Patent Number: 5,629,275
[45] Date of Patent: May 13, 1997

[54] PROCESS FOR THE PRODUCTION OF SURFACTANT-CONTAINING GRANULES

[76] Inventors: Volker Bauer, Ziegeleiweg 34, 40591 Duesseldorf; Jochen Jacobs, Teschensudberg 50, 42349 Wuppertal, both of Germany

[21] Appl. No.: 501,013

[22] PCT Filed: Feb. 2, 1994

[86] PCT No.: PCT/EP94/00300

§ 371 Date: Aug. 11, 1995

§ 102(e) Date: Aug. 11, 1995

[87] PCT Pub. No.: WO94/18302

PCT Pub. Date: Aug. 18, 1994

[30] Foreign Application Priority Data

Feb. 11, 1993 [DE] Germany .................. 43 04 015.2

[51] Int. Cl.$^6$ ........................................ C11D 11/00
[52] U.S. Cl. ................. 510/108; 510/441; 510/444; 23/313 FB
[58] Field of Search ......................... 252/89.1, 174, 252/174.13, 174.25, 135, 530, 549; 23/313 FB; 510/441, 442, 444, 108

[56] References Cited

U.S. PATENT DOCUMENTS

| | | | |
|---|---|---|---|
| 3,933,672 | 1/1976 | Bartdlotta et al. | 252/116 |
| 4,828,721 | 5/1989 | Bollier et al. | 252/8.7 |
| 4,970,017 | 11/1990 | Nakamura et al. | 252/174.13 |
| 5,189,207 | 2/1993 | Blasey et al. | 562/97 |
| 5,318,733 | 6/1994 | Carduck et al. | 264/15 |

FOREIGN PATENT DOCUMENTS

| | | |
|---|---|---|
| 0319819 | 6/1989 | European Pat. Off. . |
| 0228458 | 10/1985 | Germany . |
| 0251044 | 11/1987 | Germany . |
| 4129074 | 3/1993 | Germany . |
| 4232874 | 3/1994 | Germany . |
| 1492939 | 11/1977 | United Kingdom . |
| 9304162 | 3/1993 | WIPO . |

*Primary Examiner*—Paul Lieberman
*Assistant Examiner*—Lorna M. Douyon
*Attorney, Agent, or Firm*—Ernest G. Szoke; Wayne C. Jaeschke; Real J. Grandmaison

[57] ABSTRACT

A process for producing granules having reduced tackiness by forming granules in a fluidized bed apparatus and then adding a granule stabilizer to the discharge air stream of the apparatus after the granules have emerged from the apparatus.

14 Claims, No Drawings

PROCESS FOR THE PRODUCTION OF SURFACTANT-CONTAINING GRANULES

BACKGROUND OF THE INVENTION

1. Field of the Invention

This invention relates to the production of granules, more particularly surfactant-containing granules, which may be used in laundry detergents, dishwashing detergents or cleaning products.

2. Discussion of Related Art

The production of highly concentrated surfactant granules is known, for example, from earlier International patent application WO 93/04162, according to which the surfactant granules are produced by granulation in a fluidized bed. To this end, a surfactant preparation containing a non-surface-active liquid component is granulated and, at the same time, dried, if desired with incorporation of an inorganic or organic solid. The surfactant preparation may contain surfactants or surfactant mixtures from the group of anionic, nonionic, amphoteric and cationic surfactants, preferably anionic surfactants, more particularly fatty alkyl sulfates, $C_{9-13}$ alkyl benzene sulfonates and sulfofatty acid methyl esters, and/or nonionic surfactants, more particularly liquid ethoxylated fatty alcohols containing 2 to 8 ethylene oxide groups per mole of alcohol.

Earlier German patent application P 42 32 874.8 describes a corresponding fluidized-bed granulation process in which anionic surfactant granules are obtained by neutralization of anionic surfactants in their acid form, the process being characterized in that the anionic surfactants in their acid form are neutralized and, at the same time, granulated with a powder-form neutralizing agent and, if desired, the granules formed are simultaneously dried. In this process, too, it is possible to use either an anionic surfactant in its acid form on its own or a surfactant mixture from the group of anionic surfactants in their acid form in combination with anionic, nonionic, amphoteric and/or cationic surfactants, more particularly anionic surfactants and/or liquid ethoxylated fatty alcohols containing 2 to 8 ethylene oxide groups per mole of alcohol.

The processes mentioned above give highly concentrated surfactant granules of preferably high apparent density. However, problems in regard to the flow properties or rather the tackiness of the granules can arise in the processing of low-melting and poorly crystallizing anionic surfactants, for example alkyl benzene sulfonates and α-sulfofatty acid methyl esters, and where relatively large quantities of liquid nonionic surfactants are used.

DD 228 458 A1 and DD 251 044 A3 describe a process for the production of surfactant-containing granules in a fluidized bed, in which the granules formed are powdered with a solid in the fluidized bed in order to reduce their tackiness and hence to reduce their tendency to form lumps on leaving the fluidized bed. The disadvantage of this solution is that considerable proportions of the solid used are incorporated within the granules before they leave the fluidized bed and, accordingly, are unable to contribute towards the outer coating of the granules. In addition, this process is confined to the addition of solid, powder-form granule stabilizers.

The problem addressed by the present invention was to provide a process for the production of granules in a fluidized bed, the granules being coated with a stabilizer which may be solid or even liquid to paste-like in the processing state. Another problem addressed by the invention was to protect the granules against outside influences, for example chemical influences.

DESCRIPTION OF THE INVENTION

Accordingly, the present invention relates to a process for the production of granules in a fluidized bed in which a granule stabilizer is added after formation of the granules to reduce their tackiness, the granule stabilizer being added to the waste air stream after the granules have left the fluidized bed.

In contrast to the prior art, therefore, the granule stabilizers are added outside rather than inside the fluidized bed, being introduced into the waste air stream immediately after the fluidized bed. In this way, the surface of the granules is merely coated as required, i.e. the granule stabilizers are not undesirably incorporated within the granules. Thus, granule stabilizers which are solid, liquid or paste-like in the processing state may be used in the process according to the invention. It will readily be appreciated that this is a significant advantage over the prior art in regard to the possibilities of variation of the stabilizers used. It is even possible to use several stabilizers either separately or in the form of a mixture. In a preferred embodiment, at least one stabilizer is present in solid form at room temperature to 50° C. In a particularly preferred embodiment, solids which are capable of absorbing water and, hence, contributing towards the internal drying of the granules are used as the solid granule stabilizers. However, other preferred granule stabilizers are used in addition to or instead of the water-absorbing solids and form a protective shell, more particularly a hydrophobicizing shell, around the granules, these stabilizers preferably being applied in the form of a melt under the process conditions.

Preferred granule stabilizers include, in particular, one or more solids from the group of waxes, which are preferably introduced in the form of a melt into the granulation and drying zone, more particularly microwaxes, for example a micropowder of the type obtainable under the name of Hoechst-Wachs C® from Hoechst AG, Federal Republic of Germany; zeolites, more particularly detergent-grade zeolite NaA; alkali metal carbonates, more particularly sodium carbonate in anhydrous form; alkali metal sulfates, more particularly sodium sulfate in anhydrous form; amorphous and crystalline alkali metal silicates and natural or synthetic layer silicates, more particularly smectites and bentonites. Fine-particle solids of which at least 90% consist of particles smaller than 40 μm in diameter are preferably used as the stabilizer. The alkali metal silicates are preferably amorphous alkali metal silicates with a molar ratio of $M_2O$ (where M is sodium or potassium) to $SiO_2$ of 1:2.0 to 1:4.5 and, more particularly, 1:2.3 to 1:4.0, and/or crystalline disilicates, more particularly in the form of the sodium salts.

In another preferred embodiment of the invention, surfactants or surfactant mixtures, more particularly anionic surfactants and/or anionic surfactants in their acid form, are used as the granule stabilizers. It is of particular advantage in this embodiment to use saturated and/or unsaturated alcohol sulfates, more particularly fatty alcohol sulfates, or corresponding acids, alkyl benzene sulfonates or alkyl benzene sulfonic acid, α-sulfofatty acid alkyl esters or α-sulfofatty acids and/or salts thereof. Fatty acids and/or salts thereof, advantageously stearic acid or stearates, more particularly calcium stearate, are also preferably used. Mixtures with nonionic surfactants may also be used. In this case, alkoxylated fatty alcohols, alkyl glycosides, polyhydroxyfatty acid amides and/or alkoxylated fatty acid methyl esters are particularly preferred. The anionic surfactants or mixtures containing anionic surfactants may be produced, for example, in accordance with the teaching of earlier patent applications WO 93/04162 and P 42 32 874.8 or in accordance with the teaching of European patent application 319 819.

Other preferred granule stabilizers which advantageously influence the dissolving properties of the granules and, in particular, are used with at least one other stabilizer are polyethylene glycols with a relative molecular weight of 200 to 12,000 and preferably with a relative molecular weight of at least 2,000 and/or alkoxylated, more particularly ethoxylated, fatty alcohols containing 20 to 80 ethylene oxide groups per mole of alcohol, preferably $C_{8-18}$ fatty alcohols containing 20 to 60 moles of ethylene oxide per mole of alcohol and, more particularly, $C_{12-18}$ fatty alcohols with high percentages of $C_{16}$ and $C_{18}$ fatty alcohols containing 25 to 45 moles of ethylene oxide per mole of alcohol.

Other suitable granule stabilizers are known, non-surface-active foam inhibitors, for example silicones, preferably organopolysiloxanes, and mixtures thereof with microfine, optionally silanized silica, paraffins or waxes. Linear or branched dimethyl siloxanes which advantageously have a relative molecular weight of 1,000 to 100,000 are particularly preferred. Branched dimethyl siloxanes containing carboxylate groups in the side chains show particularly advantageous properties. The silicones are used on their own or preferably in admixture with other stabilizers. Paraffins are also preferred.

The granule stabilizers are only used in small quantities, preferably in quantities of 0.1 to 10% by weight and more preferably in quantities of 0.5 to 4% by weight, based on the stabilized granules.

The actual granulation and drying process may be carried out by any known fluidized bed granulation process, for example by the process described in DD 228 458 A1 and DD 251 044 A3. However, the processes disclosed in earlier patent applications WO 93/04162 and P 42 32 874.8 are particularly preferred. These processes give granules which have a surfactant content of at least 10% by weight and preferably from 30 to 80% by weight and an apparent density of 550 to 1,000 g/l and which do not contain any particles smaller than 50 μm in size.

The granules produced by the process according to the invention preferably contain surfactants. Granules which contain more than 10% by weight of surfactant and, more particularly, from 15 to 90% by weight of anionic and/or nonionic and, optionally, amphoteric, zwitterionic and/or cationic surfactants are particularly preferred.

The granules produced in accordance with the invention are preferably used in laundry detergents, dishwashing detergents or cleaning products.

EXAMPLES

In Examples 1 and 2 and Comparison Example C, a 60% by weight water-containing paste of the sodium salt of $C_{9-13}$ alkyl benzene sulfonate (ABS paste) was introduced through a nozzle into a Glatt granulator/dryer (Glatt, Federal Republic of Germany) by the method described in earlier patent application WO 93/04162 and granulated and, at the same time, dried together with soda (sodium carbonate, apparent density 600 g/l). Surfactant granules which had been obtained in a preceding production run (under the same process conditions) and which had substantially the same composition as the final granules of Examples 1, 2 and C were used as the starting material.

Process conditions for Examples 1, 2 and C:

| | |
|---|---|
| Fluidized bed, diameter | 400 mm |
| Fluidized bed, surface area | 0.13 m² |
| Fluidizing air flow rate (under working conditions) | 2.0 m/s |
| Bottom air temperature | 163° C. |
| Grading air temperature | 20° C. |
| Fluidizing air temperature approx. 5 cm above the bottom plate | 90° C. |
| Air exit temperature | 87° C. |

The throughputs and characteristic data of the products are shown in the following Table. Dust-free (no particles below 50 μm in diameter) and non-tacky granules were obtained in Examples 1 and 2 whereas an agglomerating mass, of which the particle size distribution could not be determined, was obtained in Example C.

TABLE

Throughputs and characteristic data of the products

| | Examples | | |
|---|---|---|---|
| | 1 | 2 | C |
| ABS paste in kg/h | 24 | 24 | 24 |
| Soda in kg/h | 25.5 | 25.5 | 25.5 |
| Starting material in kg/h | 20 | 20 | 20 |
| Stabilizer in kg/h | | | |
| Zeolite powder | 1.3 | — | — |
| Polyethylene glycol (relative molecular weight 4000) | — | 1.3 | — |
| Surfactant content in % by weight | 32 | 32 | 32 |
| Water content in % by weight | 1.2 | 1.0 | 1.2 |
| Apparent density in g/l | 650 | 650 | Not determined |
| Sieve analysis in % by weight | | | |
| >1.6 mm | 23.9 | 25.0 | |
| 0.8 | 60.8 | 57.3 | |
| 0.6 | 11.9 | 8.5 | |
| 0.4 | 2.5 | 4.8 | |
| 0.2 | 0.4 | 3.2 | |
| 0.1 | 0.3 | 1.0 | |
| 0.05 | 0.2 | 0.2 | |
| <0.05 | — | — | |

We claim:

1. A process for producing surfactant-containing granules having reduced tackiness consisting of forming said granules in a fluidized bed apparatus, and adding 0.1% to 10% by weight of a granule stabilizer based on the weight of said granules, to the discharge air stream of said apparatus after said granules have emerged from said fluidized bed apparatus.

2. The process as in claim 1 wherein said granule stabilizer is solid, liquid or pasty.

3. The process as in claim 1 wherein said granule stabilizer is added singly or as a mixture of more than one granular stabilizer.

4. The process as in claim 1 wherein said granule stabilizer comprises at least one granule stabilizer which is solid at a temperature from room temperature to 50° C.

5. The process as in claim 1 wherein said granule stabilizer comprises a solid capable of absorbing water.

6. The process as in claim 1 wherein said granule stabilizer is a solid selected from the group consisting of waxes, zeolites, alkali metal carbonate, alkali metal sulfates, alkali metal silicates, layer silicates, and mixtures thereof.

7. The process as in claim 1 wherein said granule stabilizer comprises a microwax in the form of a melt which is added to said fluidized bed apparatus.

8. The process as in claim 1 wherein said granule stabilizer is selected from the group consisting of anionic surfactants and mixtures thereof.

9. The process as in claim 8 wherein said anionic surfactants are selected from the group consisting of saturated or unsaturated alcohol sulfates and acids thereof, alkyl benzene sulfonates and acids thereof, $\alpha$—sulfofatty acid alkyl esters, $\alpha$—sulfofatty acids and salts thereof, fatty acids, soaps, and mixtures thereof.

10. The process as in claim 1 wherein said granule stabilizer comprises calcium stearate.

11. The process as in claim 1 wherein said granule stabilizer is selected from the group consisting of polyethylene glycols having a molecular weight of 200 to 12,000, alkoxylated fatty alcohols containing 20 to 80 moles of ethylene oxide per mole of alcohol, and mixtures thereof.

12. The process as in claim 1 wherein said granule stabilizer is selected from the group consisting of silicones having a molecular weight of 1,000 to 100,000, paraffins, and mixtures thereof.

13. The process as in claim 1 wherein said granules comprise from 15 to 90% by weight of surfactant, based on the weight of said granules.

14. The process as in claim 1 including adding said granules to a detergent composition.

* * * * *